United States Patent [19]

Chiu

[11] Patent Number: 4,844,740
[45] Date of Patent: Jul. 4, 1989

[54] HIGH COKING VALUE BINDER SYSTEM

[75] Inventor: Charles C. Chiu, Strongsville, Ohio

[73] Assignee: Union Carbide Corporation, Danbury, Conn.

[21] Appl. No.: 38,065

[22] Filed: Apr. 14, 1987

[51] Int. Cl.$^4$ ............................................. C08L 95/00
[52] U.S. Cl. ................................ 106/273.1; 106/284; 252/510
[58] Field of Search ................... 106/273 N, 284, 273; 252/510; 564/441

[56] References Cited

U.S. PATENT DOCUMENTS

| | | | |
|---|---|---|---|
| 2,434,564 | 1/1948 | Hester et al. | 564/441 |
| 2,500,208 | 3/1950 | Shea et al. | 106/284 |
| 4,715,897 | 12/1987 | Tailon et al. | 252/510 |

FOREIGN PATENT DOCUMENTS 1015377 12/1958 Fed. Rep. of Germany .
2045798 11/1980 United Kingdom .

OTHER PUBLICATIONS

"Studies on the Processes of Carbonization and Graphitization of Coal-Tar-Pitches Containing the Oxidizing Agents I-XIX" by S. Yamada, Tokai Technical Journal, Nr. 81 (1959).

Primary Examiner—Theodore Morris
Attorney, Agent, or Firm—James L. Sonntag

[57] ABSTRACT

A binder system for use in the production of graphite electrodes comprises pitch and a minor proportion of a polynitro-substituted aromatic compound containing an electron releasing substituent. A pitch/2,4-dinitroaniline blend results in graphite electrodes having a 14 percent improvement in coking value and a 52 percent improvement in flexural strength.

4 Claims, No Drawings

HIGH COKING VALUE BINDER SYSTEM

The present invention relates to an improved binder system for use in the production of graphite electrodes.

BACKGROUND OF THE INVENTION

In the production of graphite electrodes, aggregate carbon particles are mixed together with a binder pitch, e.g. a coal tar pitch, which serves as a fluid matrix for the aggregate particles, providing a mix which can be easily extruded into the desired shape. The coke produced from the binder after carbonization holds the aggregate particles together to yield an electrode having desirable properties. The most important requirements for the binder are high carbon yield and an acceptable softening point behavior at conventional processing temperatures. Increasing the carbon yield generally improves the electrode properties, such as flexural strength. One way to improve the coking value of the binder is to employ so called "coking catalysts". These catalysts are added to the binder to promote the coking of the low molecular weight pitch molecules at temperatures below the distillation temperature of these molecules.

Nitro-substituted aromatic compounds are known coking catalysts for binder pitch. However, these compounds are thermally unstable and undergo highly exothermic reactions even at normal mixing temperatures, e.g. 150°-180° C. Consequently, they are difficult, unsafe and impractical to use. Additionally, the use of nitroaromatic compounds in the electrode mix causes the resulting stock to swell during the baking process, negating the benefit of added coking value and leading to little, if any, improvement in graphite strength.

It is therefore an important object of this invention to provide an improved binder system for use in the production of graphite electrodes.

Another object of the invention is to provide an improved binder system including a coking catalyst which is not reactive with the pitch at normal mixing temperatures.

Still another object of the invention is to provide an improved binder system containing pitch and a nitroaromatic compound which will promote coking of the binder at higher levels than heretofore possible and produce graphite electrodes having superior physical properties.

A more specific object of the invention is to provide an improved electrode mix containing aggregate carbon particles, binder pitch, a nitro-substituted aromatic compound as a coking catalyst and an inhibitor for reducing the tendency of the "green" electrode to swell during the baking process.

Yet another object of the invention is to provide an improved method for producing graphite electrodes by shaping a mixture of aggregate carbon particles, binder pitch and a coking catalyst which is more thermally stable at mixing temperatures, and an inhibitor to prevent swelling of the "green" electrode during baking.

SUMMARY OF THE INVENTION

The present invention contemplates the use in a binder system of a unique coking catalyst comprising a polynitro-substituted aromatic compound containing an electron releasing substituent. By the term "polynitro-substituted aromatic compound" is meant any aromatic nitro-compound containing at least two nitro-groups per molecule and specifically excludes any and all mono-nitro compounds known in the prior art. In addition, the term "electron releasing substituent" means a functional group which effects a net negative charge on the aromatic ring.

Thus, in accordance with the invention, an improved binder system is provided comprising pitch and a polynitro-substituted aromatic compound containing an electron releasing substituent. A preferred polynitro-substituted aromatic compound for use in the invention is 2,4-dinitroaniline. The polynitro-substituted aromatic compound is employed in minor proportions preferably ranging from about 3 percent by weight to about 6 percent by weight of the total binder system.

In another aspect of the invention, an improved electrode mix is provided comprising aggregate carbon particles, a binder pitch including a minor proportion of a polynitro-substituted aromatic compound containing an electron releasing substituent, and an inhibitor to prevent swelling of the "green" electrode during the baking process. The swelling inhibitor preferably comprises a high temperature calcined coke flour, processed graphite flour and dibutyl phthalate.

In still another aspect of the invention, an improved method for the production of graphite electrodes is provided which comprises the steps of:

(a) forming a substantially homogeneous mixture of aggregate carbon particles and a binder comprising pitch and a minor proportion of a polynitro-substituted aromatic compound containing an electron releasing substituent;

(b) heating the mixture to an elevated temperature sufficient to render the binder fluid;

(c) shaping the fluidized mixture into the form of an electrode;

(d) baking the shaped electrode to coke the binder; and then (e) graphitizing the baked electrode by heating the electrode to graphitizing temperatures.

DESCRIPTION OF THE PREFERRED EMBODIMENTS

During the course of the experimental work leading to the invention, it was discovered that aromatic nitro-compounds with at least two nitro groups per molecule and having an electron releasing substituent are excellent binder pitch additives for use in the production of graphite electrodes. The presence of the two or more nitro-groups in each molecule of the aromatic compound unexpectedly results in significantly higher coking yields during carbonization of the binder. As a consequence, graphite electrodes made with these additives exhibit improved physical properties and particularly a greater flexural strength. Additionally, the presence of the electron releasing substituent surprisingly delays the reactivity of the additive with pitch so that normal processing can be easily achieved. A preferred polynitro-substitued aromatic compound for use in the invention is 2,4-dinitroaniline. This additive has been found to react with pitch at temperatures above about 200° C.

The binder system according to the invention is prepared by adding a minor proportion of the coking catalyst to the binder pitch. The polynitro-substituted aromatic compound is preferably added in amounts ranging from about 3% by weight to about 6% by weight of the total binder system. The binder pitch may be any petroleum or coal tar derived pitch having a softening point above about 60° C. and preferably above about 100° C. Generally, it is preferred to employ a petroleum or coal tar pitch having as high a softening point as possible since these pitches produce the highest coking values. Typically, the pitch level in the binder system may be varied from about 27 to 34 parts per hundred (pph), based on the weight of dry filler material.

The polynitro-substituted aromatic compounds used as the coking catalyst according to the invention have at least two nitro groups per molecule as distinguished from conventional mono-nitroaromatic compounds heretofore employed and also have an electron releasing substituent. The electron releasing substituent can be either an amine ($NH_2$), diethylamino ($[CH_3]_2N$), methoxy ($O\ CH_3$) or a t-butyl ($C[CH_3]_3$) group. The presence of the electron releasing substituent has a two-fold effect (1) the substituent tends to delay reactivity with the pitch so that the compound can be used safely at normal processing temperatures (e.g. 150°–180° C.) and (2) the substituent imparts plasticizing characteristics to the aromatic compound.

Illustrative of the polynitro-aromatic compounds which can be employed in the binder system of the invention are 2,4-dinitroaniline; 2,4-dinitro-dimethylaniline; 2,4-dinitroanisole and 2,4-dinitro-tributylbenzene. As already mentioned hereinabove, the preferred aromatic compound for use in the binder system is 2,4-dinitroaniline. Other polynitro-substituted aromatic compounds which can be employed should readily occur to those skilled in the art.

In an effort to demonstrate the effectiveness of the binder system according to the invention, a number of sample nitroaromatic additive/pitch blends were prepared and subjected to standard differential scanning calorimetry tests. The sample blends were prepared using both mono-nitro compounds and polynitro-aromatic compounds but only one of the latter, namely, 2,4-dinitroaniline, had an electron releasing substituent. The same binder pitch having a softening point of 110° C. was used in each of the sample blends. In addition, the amount of the nitro compound additive employed was identical, namely, 5% by weight of the total blend. In the test, the first and second exotherms in the reaction between the additive and pitch were determined and the onset temperature for the first exotherm recorded. The results of the test are given in Table I.

TABLE I

| Additive | First Exotherm Peak | First Exotherm Onset | Second Exotherm Peak |
|---|---|---|---|
| 5% 1,4,5-trinitronaphathalene | 157° C. 184° C. | 110° C. | 227° C. |
| 5% 3,5-dinitrobenzoic acid | 230 | 155 | 295 |
| 5% P-nitrobenzoic acid | 250 | 160–170 | — |
| 5% ethyl ester of 3,5-dinitrobenzoic acid | 230 | 170 | 285 |
| 5% 3,5-dinitrobenzoic acid | 240 | 170 | 275 |
| 5% 1-5-dinitrobenzene | 245 | 170 | 315 |
| 5% 1,5-dinitronaphathalene | 260 | 183 | 302 |
| 5% 2,4-dinitroaniline | 285 | 220–225 | 315 |

It will be seen from the test results outlined in Table I that only the 2,4-dinitroaniline additive reacts with pitch at temperatures above 200° C. A binder system containing this additive can therefore be employed safely and practically at normal mixing temperatures during the production of graphite electrodes.

The softening point and coking value were also determined for sample blends containing varying amounts of the 2,4-dinitroaniline additive. The sample blends were prepared using two binder pitch compositions having a softening point of 110° C. and 130° C., respectively. The softening point and coking value of the two binder pitch compositions were also determined in order to provide a basis for comparison and to calculate the plasticizing efficiency (°C./%) of each sample blend. The plasticizing efficiency is defined as the ratio between the drop in softening point temperature and the percentage of the plasticizer added. The coking value of the various samples was determined by the Modified Conradson Carbon Test (MCC) described by C. Iarr, Jr. in Analytical Methods for Coal and Coal Products, Academic Press, Vol. II, p. 521 (1978), ASTM D-189. The above data are summarized in Table II.

It will be observed from Table II that the 2,4-dinitroaniline additive acts as a plasticizer and was effective in lowering the softening point of both binder pitch compositions. For example, the conventional 110° C. pitch had its softening point lowered to 106° C. by the addition of 3.3% by weight of the 2,4-D additive and again to 102° C. upon doubling the amount of the additive. The same is also true in the case of the conventional 130° C. pitch. This is an important feature of the binder system since it greatly facilitates the formation of the electrode mix. In addition, it will be noted that the coking value is substantially increased with the addition of the 2,4-dinitroaniline because of the presence of the two nitro groups.

The binder system of the invention is advantageously employed in an electrode mixture used for producing graphite electrodes.

TABLE II

| Binder Composition | Softening Point (°C.) | Plasticizing Efficiency (°C./%) | Coking Value (wt. %) |
|---|---|---|---|
| Conventional 110° C. SP pitch | 110 | — | 59.4 |
| Conventional 130° C. SP pitch | 130 | — | 63.0 |
| 3.3% 2,4-D + 96.7% 110° C. pitch | 106 | 1.2 | 63.0 |
| 6.6% 2,4-D + 93.4% 110° C. pitch | 102 | 1.2 | 66.4 |
| 12.3% 2,4-D + 87.7% 130° pitch | 112 | 1.5 | 71.0 |

*2,4-D represents 2,4-dinitroaniline

This electrode mixture is shaped or extruded into the form of a "green" electrode which is then baked at elevated temperatures sufficient to carbonize the binder and is subsequently graphitized by heating the baked electrode to graphitizing temperatures (e.g. 2500° C.–3000° C.). In the past, various nitro-substituted compounds have been employed with the binder pitch to increase the coking value but these additives have had a detrimental effect in that they can cause the shaped "green" electrode to swell during the baking process. As a consequence, the advantage of coking value increase using these additives does not always translate into improved graphite properties. In some cases, the stock containing the coking catalyst has inferior graphite properties as compared to the stock containing no catalyst. This is due to the fact that the disadvantages of green swell sometimes out weigh the advantage of coking value increase, resulting in net losses in graphite properties. It is therefore desirable to employ an electrode mixture containing additives which will raise the coking value but which at the same time will not cause swelling of the green electrode.

Table III below contains data which illustrates the fabrication of "green" electrodes made by extruding an electrode mixture containing aggregate carbon particles, binder pitch and a minor proportion of 2,4-dinitroaniline as a coking additive. For comparison, the Table also includes data illustrating the formation of similar electrodes made by extruding a standard electrode mix which contains no catalyst. Essentially two factors should be noted (1) the electrode mix containing the 2,4-D extruded at a lower pressure than the standard mix due to the plasticizing effect of the additive and (2) the electrode mix containing the additive produced the largest percentage of green swell in the extruded article.

In order to overcome the green swell problem, it has been found advantageous to incorporate in the electrode mixture according to the invention certain materials which act as inhibitors against swelling of the "green" electrode during baking.

TABLE III

| Binder Systems | Extrusion Temperature (°C.) | Extrusion Pressure (psig) | Green Density (g/cc) | Green Swell (vol. %) |
|---|---|---|---|---|
| 30 pph 110° C. pitch + 1.1 pph stearic acid | 105 | 300 | 1.77 | 13 |
| 29.1 pph 110° C. pitch + 0.9 pph 2,4-D + 1.1 pph stearic acid | 103 | 290 | 1.77 | 21 |

*2,4-D represents 2,4-dinitroaniline

These materials include, for example, phenolic resin, high temperature calcined coke flour, processed graphite flour, mesophase pitch powder, dibutyl phthalate as well as mixtures thereof. The "high temperature calcined coke flour" referred to is typically a petroleum coke which has been calcined at temperatures in the range from about 1600° C. to about 2200° C. Such coke flours are described in greater detail, for example, in U.S. Pat. No. 4,061,600 issued to Merrow et al on Dec. 6, 1977. The "processed graphite flour" refers to graphite that has been manufactured or produced by conventional processes and then reduced in size or ground to a flour. The mesophase pitch flour should by very small in size, preferably in the range of 10 microns or less. Additionally, the mesophase pitch flour should be used in conjunction with the high temperature calcined coke flour. Precaution should be taken in the case of phenolic resin which is reactive at normal mixing temperatures. In addition, the processed graphite flour can vary in quality and should be checked to maintain consistent results. It has been found that when high temperature calcined coke flour or processed graphite flour are used, individually or in combination, as the green swell inhibitor, good results are achieved when the quantity present is equal to 25 weight percent or more of the total flour component in the mixture. Optimum amounts of these or other green swell inhibitors may readily be determined through routine experimentation by one skilled in the art.

The preferred green swell inhibitor for use in an electrode mixture according to the invention is the combination of a high temperature calcined coke flour and dibutyl phthalate. The calcined coke flour in this instance can replace about three-quarter of the regular coke flour that is ordinarily employed in the standard electrode mixture, while the dibutyl phathalate can replace part of any plasticizers such as stearic acid, that may be employed in the mixture.

To further illustrate the practice of the invention, six inch diameter graphite electrode stock was produced by extruding a mixture containing petroleum coke particles, binder pitch, 2,4-dinitroaniline as a coking additive, swelling inhibitors comprising dibutyl phthalate and high temperature calcined coke flour, and stearic acid as a plasticizer. A standard six inch graphite electrode stock was also produced by extruding a mixture containing the same petroleum coke particles binder pitch and plasticizer but containing no additional additives. Table IV below shows the forming results.

TABLE IV

| Run No. | Binder Systems | Total Binder pph | HT Calcined Coke Flour (wt. %) | Extrusion Pressure (psig) | Green Density (g/cc) | Green Swell (vol. %) |
|---|---|---|---|---|---|---|
| 1. | 29 pph 110° C. pitch + 1 pph stearic acid | 29.0 | 0 | 400 | 1.78 | 12.1 |
| 2. | 31.8 pph 110° C. pitch + 0.9 pph 2,4-D + 0.9 pph DBP + 0.2 pph stearic acid | 32.7 | 33.6 (¾ of flour) | 380 | 1.76 | 7.2 |
| 3. | 32.4 pph 110° C. pitch + 1.0 pph 2,4-D + 0.9 pph DBP + 0.2 pph stearic acid | 33.4 | 33.6 (¾ of flour) | 380 | 1.76 | 8.1 |
| 4. | 31.8 pph 110° C. pitch + 1.9 pph 2,4-D + 0.5 pph DBP + 0.2 pph stearic acid | 33.7 | 33.6 (¾ of flour) | 380 | 1.78 | 8.8 |

*2,4-D represents 2,4-dinitroaniline
DBP represents dibutyl

In Table IV, it will be noted that the high temperature calcined coke flour replaced three-quarters of the regular pertroleum coke flour used in the binder systems that that the dibutyl phthalate also replaced part of the staric acid plasticizer. Normal extrusion conditions were achieved using the 2,4-dinitroaniline additive at levels of about 3 weight percent of the pitch (Run Nos. 2 and 3). When the level of the 2-4,D was increased to about 6 percent by weight (Run No. 4), the concentration of the DBP was reduced to achieve normal extrusion conditions, because of the plasticizing effect of the 2-4,D.

It is of course significant to note that the green swell of the stock using the 2,4-dinitroaniline was well under control for all the binder samples in Table IV, due to the presence of the inhibitors i.e. high temperature calcined coke flour and dibutyl phthalate. The extruded stock was then baked at elevated temperatures of about 900° C. The bake results are shown in Table V.

TABLE V

| Binder Systems | Green Density (g/cc) | Weight Loss (wt. %) | Coke Yield (wt. %) | Binder Coke Content (wt. %) | Volume Change (vol. %) | Bake Density (g/cc) |
|---|---|---|---|---|---|---|
| 29 pph 110° C. pitch + 1 pph stearic acid | 1.78 | 7.5 | 67.3 | 15.5 | −0.2 | 1.65 |
| 31.8 pph 110° C. pitch + 0.9 pph 2,4-D + 0.9 pph DBP + 0.2 pph stearic acid | 1.76 | 6.3 | 75.7 | 19.4 | −0.3 | 1.65 |
| 32.4 pph 110° C. pitch + 1 pph 2,4-D + 0.9 pph + DBP + 0.2 pph stearic acid | 1.76 | 6.5 | 74.4 | 19.0 | −0.6 | 1.65 |
| 31.8 pph 110° C. pitch + 1.9 pph 2,4-D + 0.5 pph DBP + 0.2 pph stearic acid | 2.77 | 6.3 | 75.4 | 19.2 | −0.6 | 1.67 |

Table V shows that a 14% increase in coke yield was obtained with the addition of about 3% wt. of the 2,4-dinitroaniline to the pitch. It will be furthermore observed that a much larger volume decrease was achieved with the electrode mixtures containing the inhibitors, thus confirming the green swell measurements in the previous table. The baked stock made with each binder system was then graphitized by heating the stock to temperatures of about 3000° C. according to standard procedures. The graphite results are shown in Table VI below.

As shown in Table VI, the graphitized stock made from the mix formulation utilizing the 3 wt. % 2,4-dinitroaniline/pitch blend (Run Nos. 2 and 3) was 52 percent stronger than the graphitized control stock. Moreover, this 52 percent increase in flexural strength was accompanied with only a 26% increase in Young's modulus. The increase in both the flexural strength and strength to Young's modulus ratio will result in improved performance of the graphite stock under actual field conditions.

pound/pitch binder system according to the invention produces higher coking values during carbonization and at the same time can be employed safely and practically at normal mixing temperatures. Moreover, the improved electrode mixture containing the inhibitors according to the invention significantly reduce the green swell problem that occurs when a nitroaromatic compound is employed as a coking additive.

What is claimed is:

1. A binder system for use in the production of graphite electrodes, which comprises pitch and a minor proportion of a 2,4-dinitroaniline.

2. The binder system of claim 1 wherein the 2,4-dinitroaniline is present in an amount between about 3 and about 6 weight percent, based on the total weight of the binder system.

3. An electrode mixture comprising finely-divided carbon particles and a binder therefor, said binder comprising pitch and a minor proportion of 2,4-dinitroaniline.

4. The electrode mixture of claim 3 wherein the 2,4-dinitroaniline is present in an amount between about 3 and about 6 weight percent, based on the total weight of the binder system.

TABLE VI

| Run No. | Binder Systems | Green Density (g/cc) | Graphite Density (g/cc) | Specific Resistance (μ-ohm-m) WG | AG | Young's Modulus ($10^6$ psi) WG | AG | Flexural Strength (psi) WG | AG | CTE ($10^{-6}$/°C.) WG | AG |
|---|---|---|---|---|---|---|---|---|---|---|---|
| 1. | 29.0 pph 110° C. pitch + 1 pph stearic acid | 1.78 | 1.61 | 6.64 | 9.22 | 0.93 | 0.55 | 1192 | 1003 | 0.53 | 1.67 |
| 2. | 31.8 pph 110° C. pitch + 0.9 pph 2,4-D + 0.9 pph DBP + 0.2 pph stearic acid | 1.76 | 1.62 | 6.32 | 9.39 | 1.17 | 0.64 | 1812 | 1277 | 0.50 | 1.60 |
| 3. | 32.4 pph 110° C. pitch + 1 pph 2,4-D + 0.9 pph DBP + 0.2 pph stearic acid | 1.76 | 1.61 | 6.46 | 9.39 | 1.11 | 0.63 | 1766 | 1317 | 0.51 | 1.62 |
| 4. | 31.8 pph 110° C. pitch + 1.9 pph 2,4-D + 0.5 pph DBP + 0.2 pph stearic acid | 1.77 | 1.62 | 6.49 | 9.53 | 1.12 | 0.62 | 1649 | 1178 | 0.48 | 1.54 |

From the foregoing, it will be readily apparent that the invention provides an improved binder system and electrode mixture for use in the production of graphite electrodes. The polynitro-substituted aromatic com-

* * * * *

UNITED STATES PATENT AND TRADEMARK OFFICE
CERTIFICATE OF CORRECTION

PATENT NO. : 4,844,740
DATED : July 4, 1989
INVENTOR(S) : Charles C. Chiu

It is certified that error appears in the above-identified patent and that said Letters Patent is hereby corrected as shown below:

Column 4, line 11, "Iarr" should read "Karr"

Column 6, line 48, insert "phthalate" after "dibutyl"

Column 6, line 52, delete "r" from "pertroleum"

Column 6, line 53, replace "that" (first occurrence) with "and"

Column 6, line 54, "staric acid" should read "stearic acid"

Column 7, line 15, first entry "2.77" should read "1.77"

Signed and Sealed this

Twenty-fourth Day of April, 1990

Attest:

HARRY F. MANBECK, JR.

Attesting Officer

Commissioner of Patents and Trademarks